(12) United States Patent
Sato et al.

(10) Patent No.: US 11,150,214 B2
(45) Date of Patent: Oct. 19, 2021

(54) CAPILLARY ELECTROPHORESIS APPARATUS AND THERMOSTAT

(71) Applicant: Hitachi High-Technologies Corporation, Tokyo (JP)

(72) Inventors: Wataru Sato, Tokyo (JP); Motohiro Yamazaki, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 200 days.

(21) Appl. No.: 16/484,696

(22) PCT Filed: Mar. 8, 2018

(86) PCT No.: PCT/JP2018/008888
§ 371 (c)(1),
(2) Date: Aug. 8, 2019

(87) PCT Pub. No.: WO2018/180327
PCT Pub. Date: Oct. 4, 2018

(65) Prior Publication Data
US 2020/0057022 A1    Feb. 20, 2020

(30) Foreign Application Priority Data
Mar. 29, 2017    (JP) .............................. JP2017-064153

(51) Int. Cl.
*G01N 27/447*    (2006.01)
(52) U.S. Cl.
CPC . *G01N 27/44704* (2013.01); *G01N 27/44756* (2013.01)
(58) Field of Classification Search
CPC ................... G01N 27/44704; G01N 27/44756
See application file for complete search history.

(56) References Cited

U.S. PATENT DOCUMENTS 7,883,613 B2 *    2/2011    Gomi ............... G01N 27/44721
                                                                   204/601
2002/0023839 A1    2/2002    Inaba et al.
(Continued)

FOREIGN PATENT DOCUMENTS

JP        2002-71642 A       3/2002
JP        2003-166976 A      6/2003
(Continued)

OTHER PUBLICATIONS

Resistivity and Conductivity (Year: 2021).*
(Continued)

*Primary Examiner* — Luan V Van
*Assistant Examiner* — Caitlyn Mingyun Sun
(74) *Attorney, Agent, or Firm* — Crowell & Moring LLP

(57) ABSTRACT

The capillary electrophoresis apparatus according to the present invention can maintain the temperature in the longitudinal direction of each of a plurality of capillaries uniformly, such that the separation performance of the capillary electrophoresis apparatus can be stabilized, and the analysis performance can be improved. A capillary electrophoresis apparatus according to the present invention includes: a thermostat having a heat source, a first heat conduction member, and a detection window for detecting a sample, the thermostat being configured to maintain a capillary at a predetermined temperature; a capillary holder having a second heat conduction member for sandwiching the capillary between the second heat conduction member and the first heat conduction member, the capillary holder being configured to hold the capillary; and a detection unit configured to detect a sample to be electrophoresed in the capillary, wherein in the heat source, a heat generation amount of at least one of a periphery of the detection
(Continued)

window and an end of the capillary is higher than a heat generation amount of another portion.

15 Claims, 12 Drawing Sheets

(56) References Cited

U.S. PATENT DOCUMENTS

| | | |
|---|---|---|
| 2003/0102221 A1 | 6/2003 | Ozawa et al. |
| 2006/0188403 A1* | 8/2006 | Parng ............... G01N 27/44704 422/503 |
| 2006/0219559 A1 | 10/2006 | Ugai et al. |
| 2007/0278101 A1 | 12/2007 | Gomi et al. |
| 2015/0241389 A1* | 8/2015 | Hill .................... B32B 37/18 204/603 |
| 2017/0016853 A1 | 1/2017 | Maher |
| 2019/0041359 A1 | 2/2019 | Nakazawa et al. |

FOREIGN PATENT DOCUMENTS

| | | |
|---|---|---|
| JP | 2006-284530 A | 10/2006 |
| JP | 2007-322367 A | 12/2007 |
| JP | 2011-89853 A | 5/2011 |
| JP | 2011-112375 A | 6/2011 |
| WO | WO 2015/134943 A1 | 9/2015 |
| WO | WO 2017/158811 A1 | 9/2017 |

OTHER PUBLICATIONS

Joule heating—Wikipedia (Year: 2021).*
International Search Report (PCT/ISA/210) issued in PCT Application No. PCT/JP2018/008888 dated Jun. 12, 2018 with English translation (four (4) pages).
Japanese-language Written Opinion (PCT/ISA/237) issued in PCT Application No. PCT/JP2018/008888 dated Jun. 12, 2018 (six (6) pages).

* cited by examiner

CAPILLARY ELECTROPHORESIS APPARATUS AND THERMOSTAT

TECHNICAL FIELD

The present invention relates to a thermostat in a capillary electrophoresis apparatus for separating and analyzing nucleic acids, proteins and the like.

BACKGROUND ART

In a capillary electrophoresis apparatus in which a capillary is filled with an electrophoresis medium such as a polymer gel or a polymer solution, and electrophoresis is performed by applying a high voltage to both ends of the capillary, PTL 1 describes that "a thermostat apparatus has a body frame and a door frame, and the temperature control member is mounted in the body frame." and "a capillary is held by being sandwiched between a temperature control member of the body frame and a capillary array pressing sponge of the door frame, and therefore, a temperature is always maintained constant."

CITATION LIST

Patent Literature

PTL 1: JP 2007-322367 A

SUMMARY OF THE INVENTION

Technical Problem

PTL 1 describes a thermostat apparatus that efficiently dissipates self-generated heat by a capillary by contacting the capillary with a temperature control member. However, in the thermostat apparatus described in PTL 1, the thermostat apparatus temperature locally drops around a detection unit fixed to the thermostat apparatus, and therefore the temperature distribution of a temperature control member becomes uneven.

The present invention has been made to solve such problems, and its object is to provide a capillary electrophoresis apparatus with high analytical performance by keeping a temperature in the longitudinal direction of the capillary constant.

Solution to Problem

To solve the above problems, the capillary electrophoresis apparatus according to the present invention includes:

a thermostat having a heat source, a first heat conduction member, and a detection window for detecting a sample, the thermostat being configured to maintain a capillary at a predetermined temperature;

a capillary holder having a second heat conduction member for sandwiching the capillary between the second heat conduction member and the first heat conduction member, the capillary holder being configured to hold the capillary; and a detection unit configured to detect a sample to be electrophoresed in the capillary, wherein in the heat source, a heat generation amount of at least one of a periphery of the detection window and an end of the capillary is higher than a heat generation amount of another portion.

Advantageous Effects of Invention

The capillary electrophoresis apparatus according to the present invention can maintain a temperature in the longitudinal direction of capillaries uniformly, such that the separation performance of the capillary electrophoresis apparatus can be stabilized, and the analysis performance can be improved.

DESCRIPTION OF EMBODIMENTS

Figure 9:
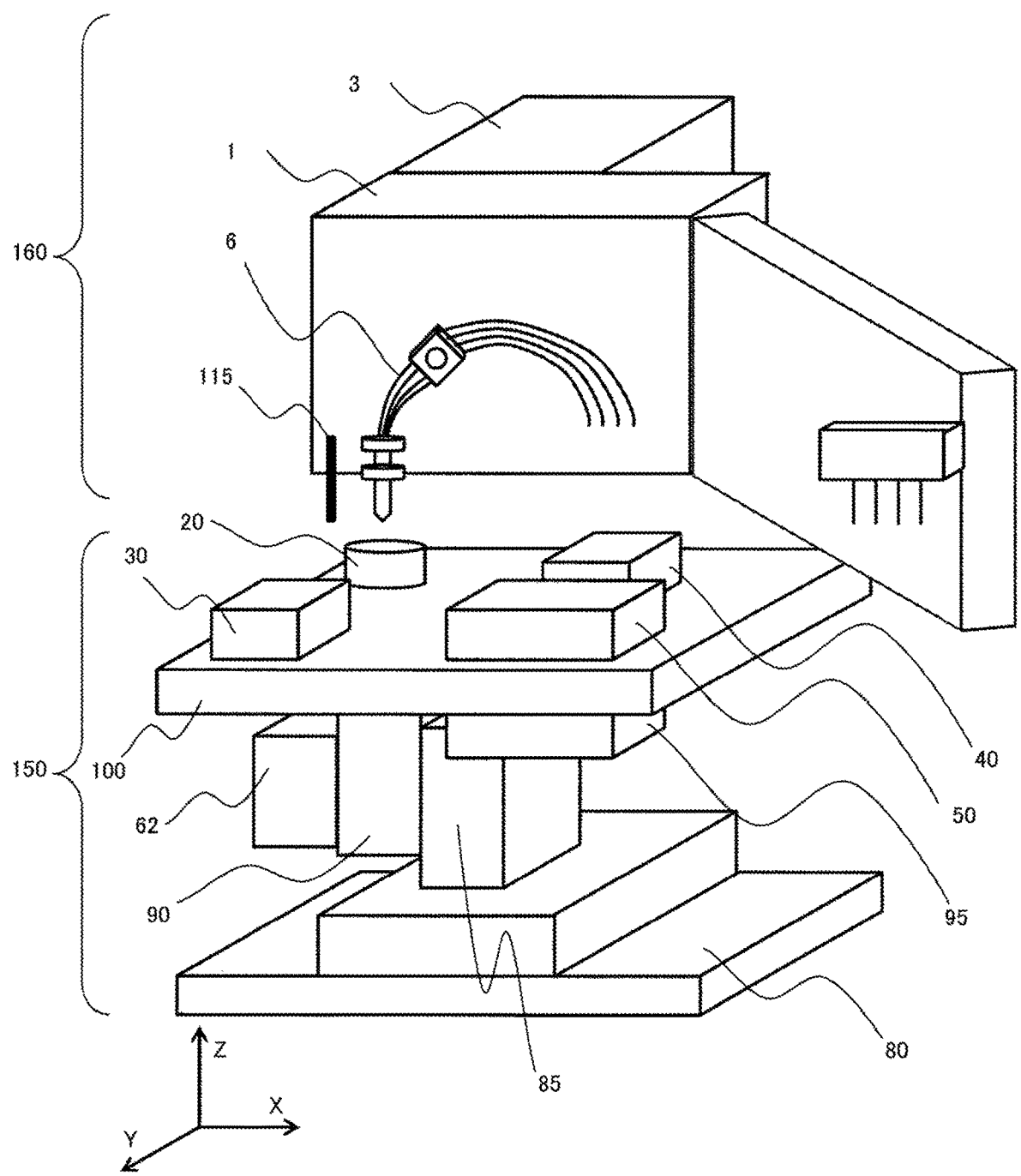
FIG. 9 is a perspective view of a capillary electrophoresis apparatus.

FIG. 9 illustrates a schematic view of a capillary electrophoresis apparatus according to the present embodiment. The apparatus can be roughly divided into two units, an auto sampler unit 150 disposed at a lower part of the apparatus and an irradiation detection/thermostat unit 160 disposed at an upper part of the apparatus.

In the auto sampler unit 150, a Y-axis driver 85 is mounted on a sampler base 80. In addition, a Z-axis driver 90 is mounted on the Y-axis driver 85. A sample tray 100 is mounted on the Z-axis driver 90, and an electrophoretic medium container 20, an anode buffer container 30, a cathode buffer container 40, and a sample container 50 can be set on the sample tray 100. The sample container 50 is set on the X-axis driver 95 mounted on the sample tray 100 and can be driven along the X-axis. A liquid feeding mechanism 62 is also mounted on the Z-axis driver 90. The liquid feeding mechanism 62 is disposed below the electrophoretic medium container 20.

The irradiation detection/thermostat unit 160 is provided with the thermostat 1, and the inside can be maintained at a constant temperature. An irradiation detection unit 3 is mounted behind the thermostat 1 to enable detection during electrophoresis. The capillary 6 is set in the thermostat 1, electrophoresis is performed in the thermostat 1 while keeping the capillary 6 at a constant temperature, and detection is performed by the irradiation detection unit 3. Further, an electrode 115 is also mounted on the thermostat 1 for dropping to GND when a high voltage is applied for electrophoresis.

As described above, the capillary 6 is fixed to the thermostat 1. The electrophoretic medium container 20, the anode buffer container 30, the cathode buffer container 40, and the sample container 50 can be driven along the Y axis and the Z axis by the auto sampler unit 150, and the sample container 50 can be further driven along the X axis. The electrophoretic medium container 20, the anode buffer container 30, the cathode buffer container 40, and the sample container 50 can be connected to the fixed capillary 6 while being switched by the movement of the auto sampler unit 150.

Figure 1:
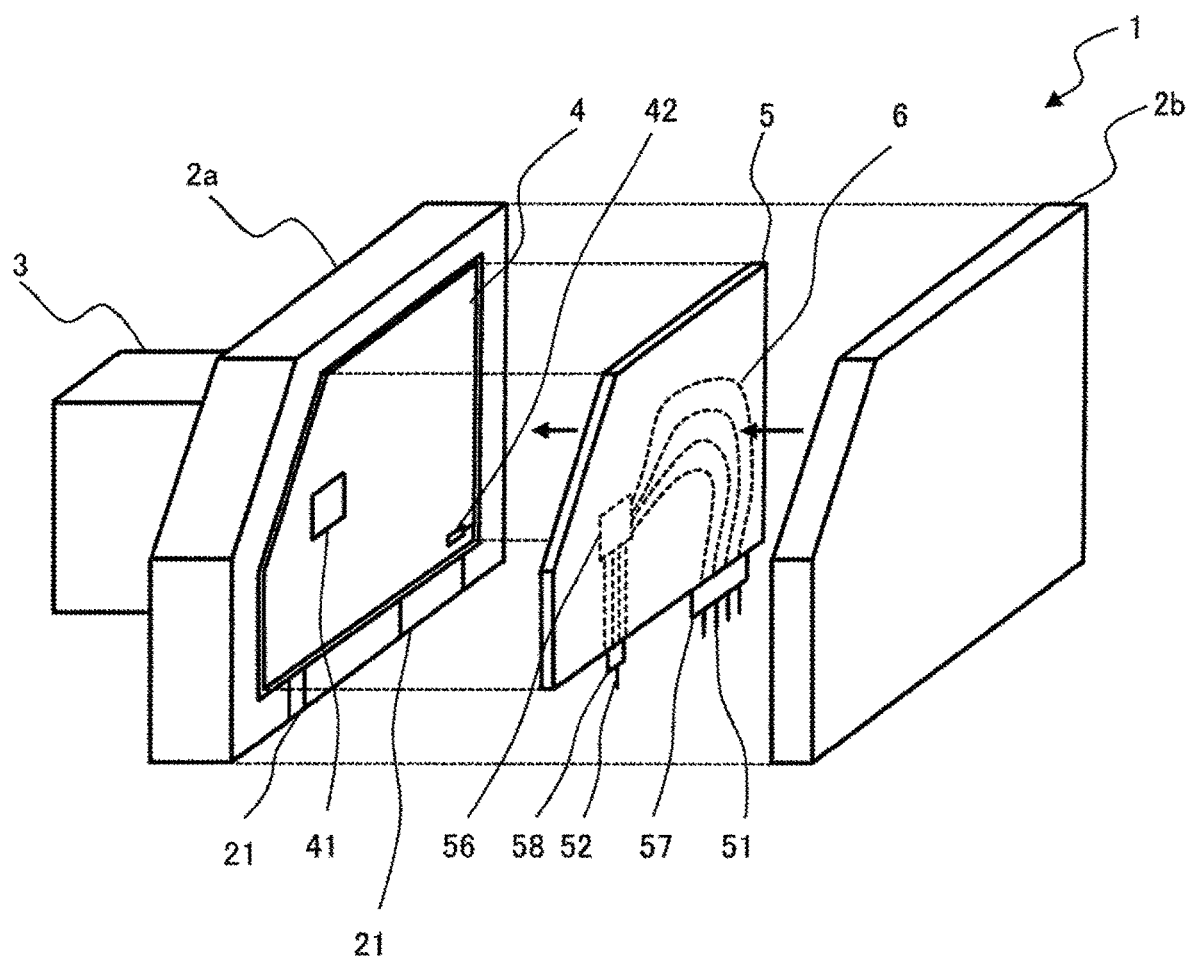
FIG. 1 is an exploded view of a thermostat in a capillary electrophoresis apparatus.

FIG. 1 is a schematic view of the thermostat 1 in the capillary electrophoresis apparatus. The thermostat 1 includes a case body 2a, a capillary holder 5, which holds the capillary 6, and a case lid 2b. Here, the capillary 6 and the capillary detection unit 56 are disposed on a surface which is not originally visible, but are illustrated by a broken line in FIG. 1 for the sake of explanation. The irradiation detection unit 3 and the temperature control unit 4 are disposed in the case body 2a. Here, the irradiation detection unit 3 irradiates the capillary 6 with light from a light source (not illustrated) such as a laser or an LED, and detects fluorescence or the like emitted from the capillary 6. Therefore, the temperature control unit 4 is provided with a detection window 41.

Furthermore, a temperature sensor 42 for measuring a temperature of the temperature control unit 4 is disposed in the temperature control unit 4, a surface temperature of the temperature control unit 4 is measured, and output of the temperature control unit 4 is adjusted to obtain a desired temperature. The capillary 6 is fixed to the capillary holder 5. At a lower end of the capillary holder 5, both ends of the capillary 6 are fixed by an electrode holder 57 and a capillary head 58, and a cathode end 51 and an anode end 52 of the capillary 6 project.

In the capillary electrophoresis apparatus, electrophoresis is performed by bringing the cathode end 51 into contact with a sample solution (not illustrated), bringing the anode end 52 into contact with a buffer solution (not illustrated), and applying a high voltage to both ends. The capillary holder 5 is sandwiched between the case lid 2b and the case body 2a and is pressed against the temperature control unit 4. An opening portion 21 is provided in the lower part of the case body 2a such that the cathode end 51 and the anode end 52 exposed to the outside from the case body 2a can be in liquid contact with the sample solution or the buffer solution.

Figure 2A:
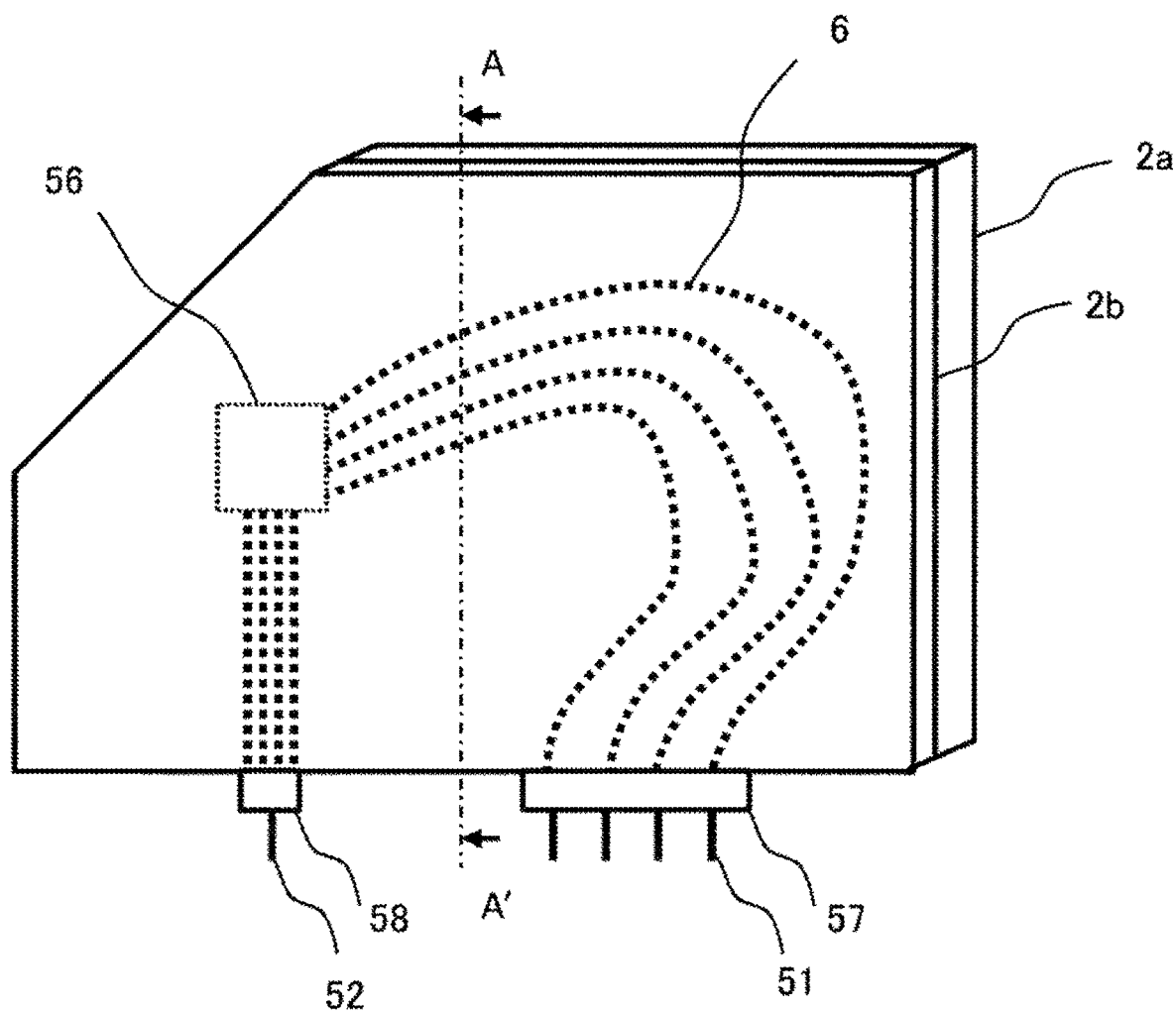
FIG. 2A is a perspective view of the thermostat.
Figure 2B:
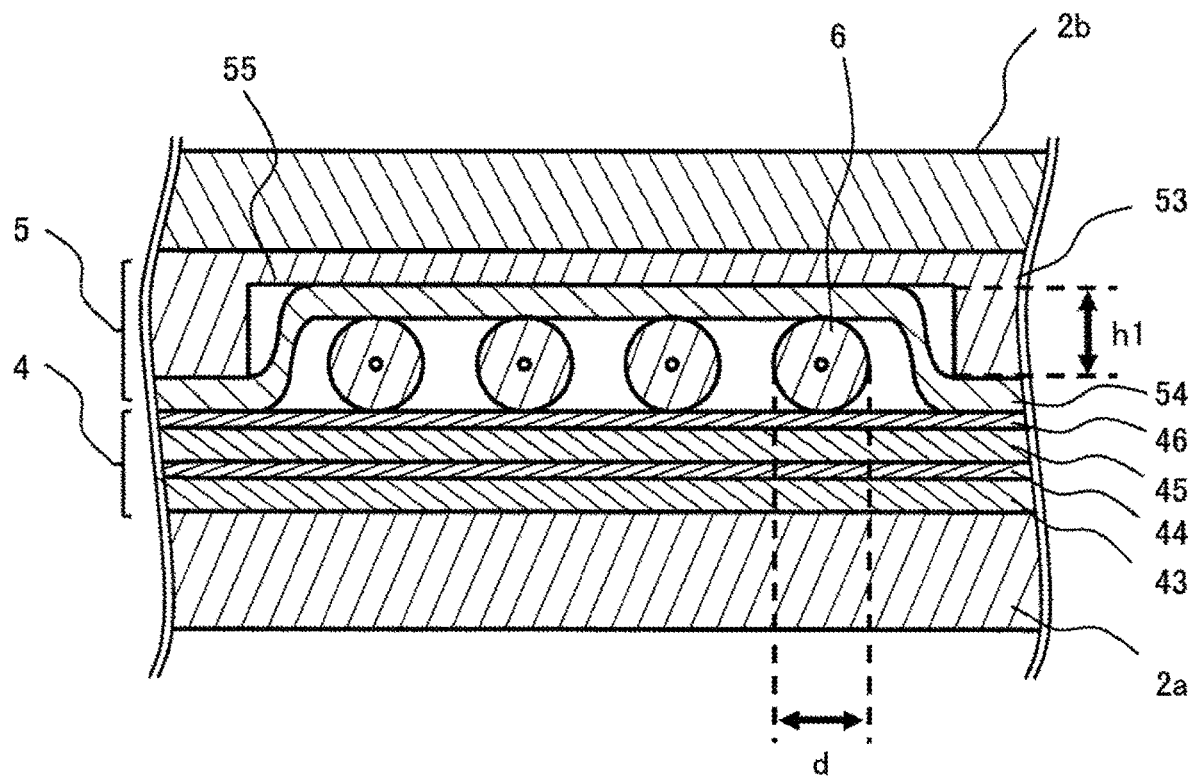
FIG. 2B is a cross-sectional view of the thermostat.

FIG. 2A is a perspective view when the capillary holder 5 is fixed to the case body 2a by the case lid 2b, and FIG. 2B is a cross-sectional view taken along line A-A' of the thermostat 1 including the capillary 6 in FIG. 2A.

In the thermostat 1 illustrated in FIG. 2A, the capillary holder 5 is pressed against the temperature control unit 4 by the case lid 2b and fixed to the case body 2a. In this structure, although the structures of the temperature control unit 4 and the capillary holder 5 cannot be seen, the arrangement of the capillary 6 and the capillary detection unit 56 is schematically indicated by a broken line. Further, although an example in which four capillaries 6 are disposed is indicated in the present embodiment, the number of the capillaries is not limited to four.

As illustrated in FIG. 2B, the temperature control unit provided in the case body 2a includes a heat insulation layer 43, a heater layer 44, a heat diffusion plate 45, and a first heat conduction sheet 46.

The capillary holder 5 includes a support substrate 53, a flexible second heat conduction sheet 54 fixed to the support substrate 53, and the capillary 6 with a diameter (d) disposed on a surface of the second heat conduction sheet 54. The support substrate 53 is provided with dents 55 with height (h1). At this time, the height (h1) of the dent 55 formed in the support substrate 53 is smaller than the diameter (d) of the capillary 6 (h1<d). The second heat conduction sheet 54 is flexible and thus deforms along the dents 55 of the support substrate 53. In addition, the capillary 6 is disposed along the dents 55 formed on the support substrate 53.

Here, by fixing the capillary holder 5 to the case body 2a with the case lid 2b, the second heat conduction sheet 54 fixed to the support substrate 53 is brought into contact with the first heat conduction sheet 46 that is a surface of the temperature control unit 4. The capillary 6 disposed in the dent 55 of the support substrate 53 contacts the first heat conduction sheet 46 and the second heat conduction sheet 54 deformed along the dents 55 of the support substrate 53.

The first heat conduction sheet 46 and the second heat conduction sheet 54 play a role of transmitting heat of the heater layer 44 to the capillary 6, simultaneously receiving heat generated by the capillary 6, and suppressing an excessive temperature increase in the capillary 6. Therefore, the heat conduction sheets are required to have thermal conductivity and insulation and are formed using, for example, a material such as thermally conductive rubber.

Figure 3A:
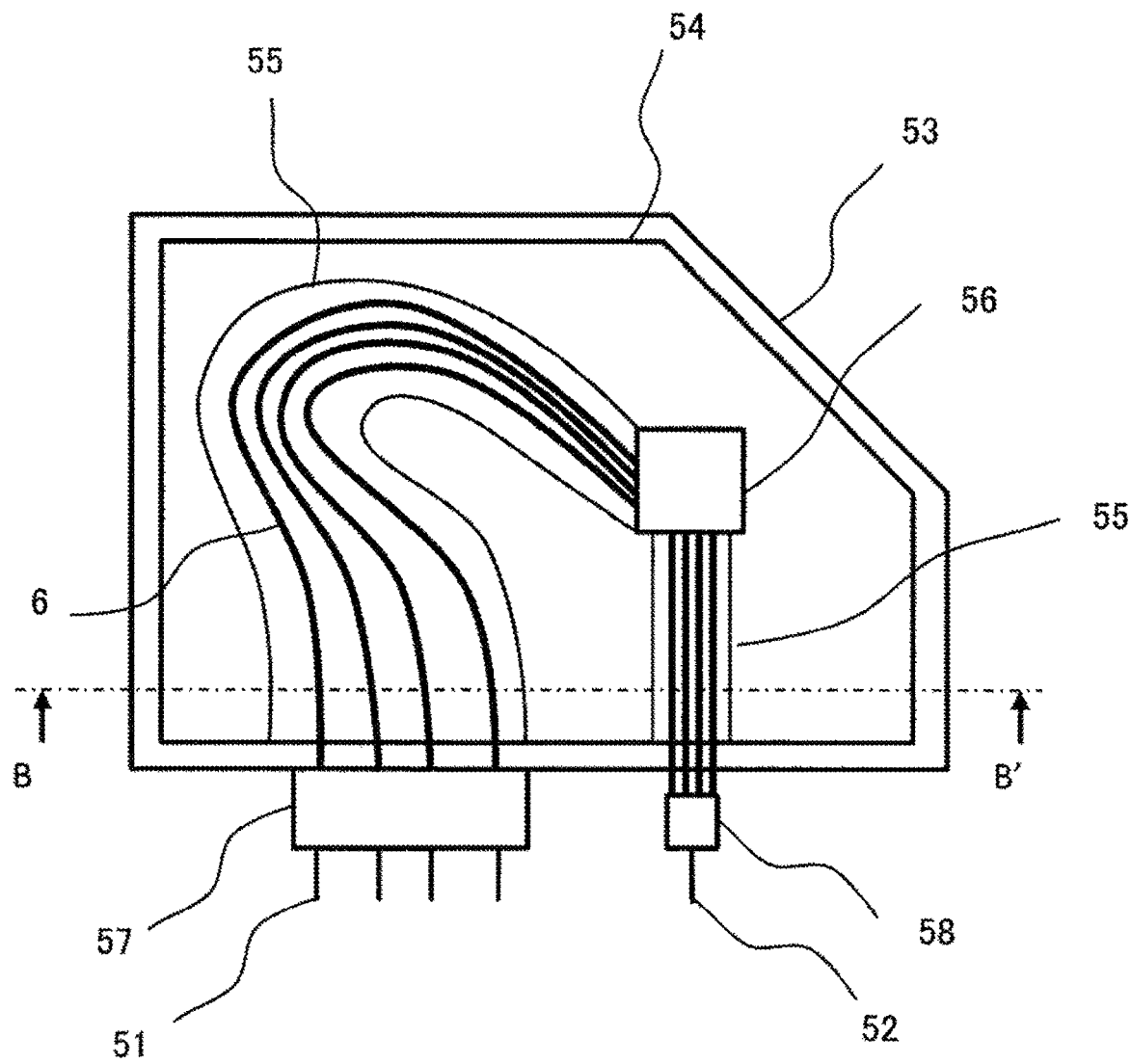
FIG. 3A is a plan view of a capillary holder.
Figure 3B:
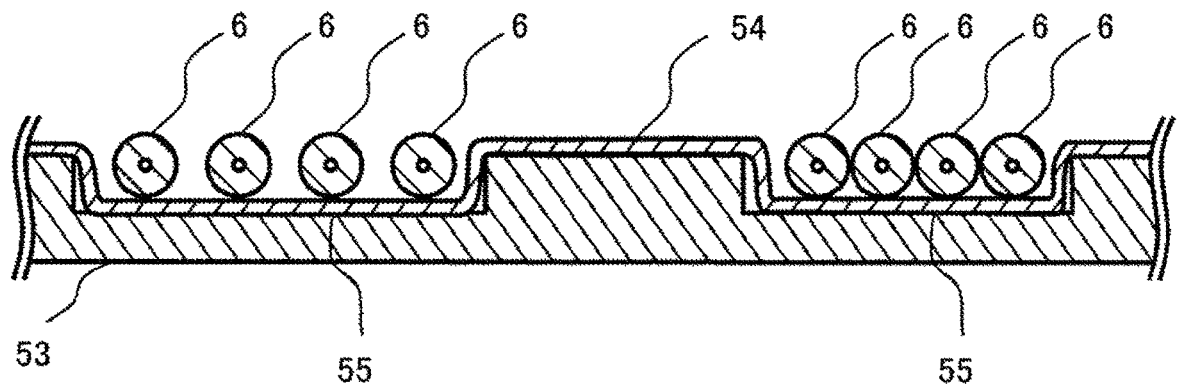
FIG. 3B is a cross-sectional view of the capillary holder.

The structure of the capillary holder 5 will be described in detail with reference to FIGS. 3A and 3B. FIG. 3A is a plan view indicating the position of the capillary 6 disposed in the capillary holder 5, and FIG. 3B is a cross-sectional view of the capillary holder 5 (a cross section B-B' in FIG. 3A). The capillary holder 5 is formed by fixing the flexible second heat conduction sheet 54 to the support substrate 53 and disposing the capillary 6 on the second heat conduction sheet 54. The second heat conduction sheet 54 is flexible and can be deformed according to the surface shape of the support substrate 53. Further, the end of the capillary 6 is fixed to the electrode holder 57, and the capillary 6 is disposed along the dents 55 formed by the second heat conduction sheet 54. The capillary 6 is fixed to the capillary detection unit 56 provided in the capillary holder 5, and the other end is connected to the capillary head 58. The capillary detection unit 56 is fixed to the detection window 41 of the temperature control unit 4.

Although the support substrate 53 presses the capillary 6 against the first heat conduction sheet 46, the case lid 2b does not have a temperature control function and serves as a heat radiation path of the temperature control unit 4, and therefore the heat conductivity is desirably low, and the case lid 2b is preferably formed of, for example, a resin material. In addition, a heat insulation layer may be provided between the support substrate 53 and the case lid 2b. Furthermore, the dent 55 provided in the support substrate 53 does not have to be one dent 55 for a plurality of the capillaries 6, and the dent 55 may be formed for each capillary.

Figure 4:
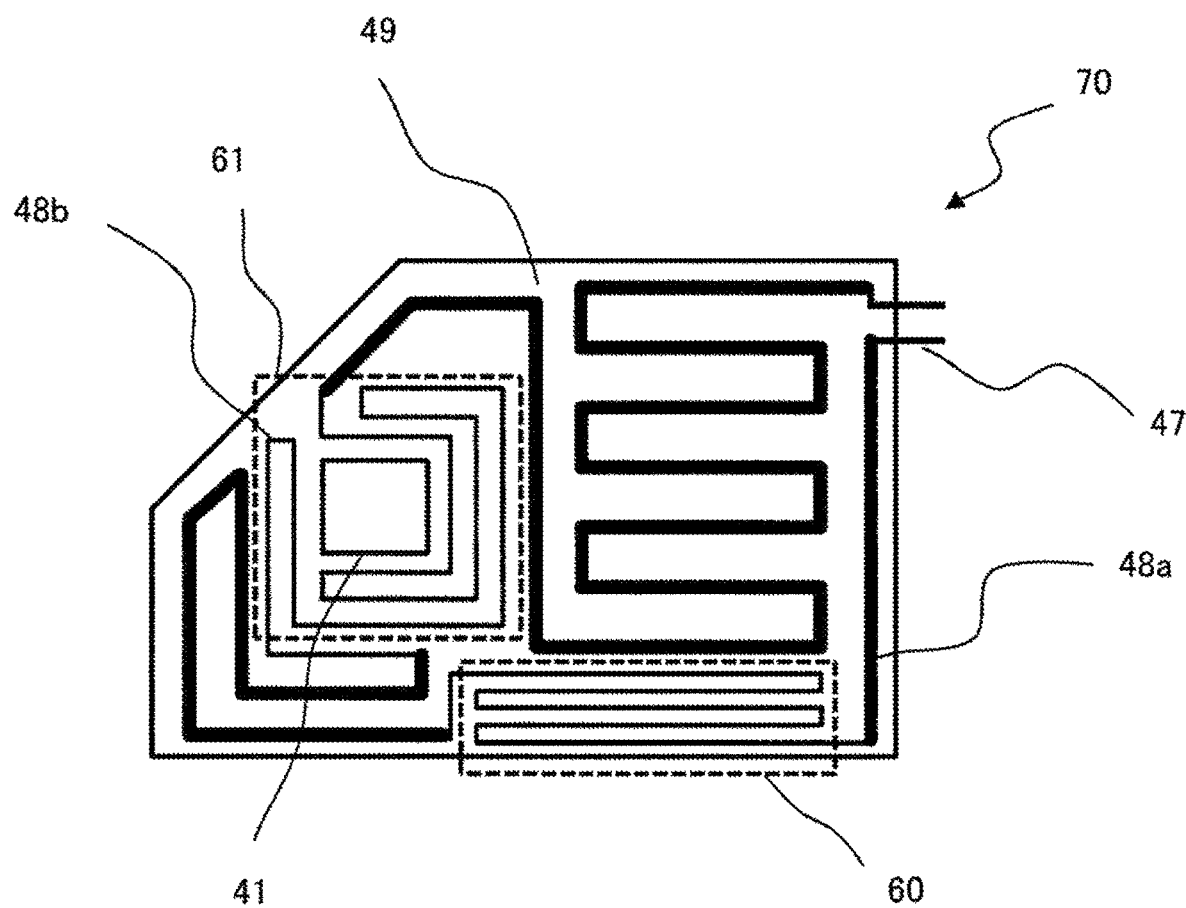
FIG. 4 is a plan view of a heater.

FIG. 4 illustrates a pattern of a heating resistance wire when the heater layer 44 of the temperature control unit is a sheet-like heater 70. The sheet-like heater 70 is formed of a base member 49, a first heating resistance wire 48a, and a second heating resistance wire 48b. As the base member 49, for example, a polyimide film, silicone rubber, ceramic or the like is used. In the present embodiment, a heater terminal 47 is provided on the base member 49, and the first heating resistance wire 48a and the second heating resistance wire 48b are connected in series to the heater terminal 47. The first heating resistance wire 48a is a heating resistance wire wider than the second heating resistance wire 48b.

Here, the first high heat generation region 60 in which the second heating resistance wire 48b is densely disposed in the fixed portion of the electrode holder 57, and the second high heat generation region 61, in which the periphery of the detection window 41 is provided as the second heating resistance wire 48b, and thus heat generation amount is increased by disposing the second heating resistance wire 48b densely, are provided. The other area is provided as the first heating resistance wire 48a, and the heat generation amount is reduced by disposing the first heating resistance wire 48a sparsely. That is, the heater layer 44 is formed by dividing the in-plane heat generation amount into at least two of a large region and a small region.

However, it is not necessary to adjust the heat generation amount only by the thickness of the wire or the density, and for example, the heater may be divided for each area and temperature control may be performed individually. Furthermore, the heat generation amount of the heater is not limited to two stages and may be divided into three or more stages in accordance with heat radiation conditions of a temperature control structure.

Furthermore, since the heat diffusion plate 45 forming the temperature control unit 4 is required to uniformly spread the heat generation of the heater to the first heat conduction sheet 46, it is preferable that the heat diffusion plate 45 is a metal material having high heat conductivity and, for example, is formed of aluminum or copper.

According to the embodiment described above, the following operational effects can be obtained.

(1) Reduce temperature variation in the longitudinal direction of the capillary 6

In the capillary 6, since the opening portion 21 is provided in the case body 2a in the vicinity of the electrode holder 57 and the capillary head 58 provided outside the thermostat 1, the amount of heat radiation is large, and the temperature of the temperature control unit 4 near the opening portion 21 drops. Similarly, the detection window 41 has the irradiation detection unit 3 disposed on the back of the heater, and the heater cannot be disposed, and the irradiation detection unit 3 serves as a heat radiation path, and therefore the temperature of the heater surface locally drops. In the heater layer 44 in the present embodiment, since the heat generation amount in the vicinity of the detection window 41 and the opening portion 21 provided in the case body 2a is large, by providing the first high heat generation region 60 and the second high heat generation region 61 near the opening portion 21 and the detection window 41 in the temperature control unit 4, the temperature decrease can be suppressed, the temperature variation on the surface of the first heat conduction sheet 46 can be reduced, and the temperature variation in the longitudinal direction of the capillary 6 can be reduced.

(2) Reduce temperature variation in the radial direction of the capillary 6

Since the capillary 6 is disposed along the dents 55 provided in the support substrate 53 of the capillary holder 5, the second heat conduction sheet 54 is in close contact with the first heat conduction sheet 46 provided in the temperature control unit 4, and the temperature difference between the second heat conduction sheet 54 and the first heat conduction sheet 46 is reduced. Since the capillary 6 is sandwiched between the first heat conduction sheet 46 and the second heat conduction sheet 54, the temperature difference in the radial direction of the capillary 6 becomes small because the temperature difference becomes small.

Figure 5:
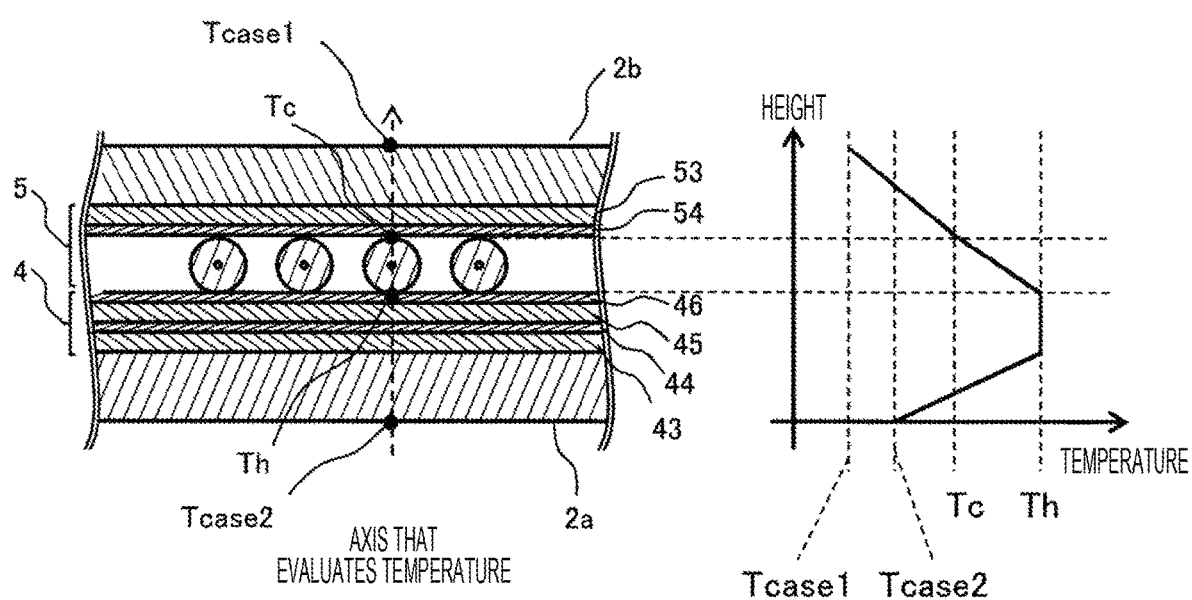
FIG. 5 is a diagram for explaining a temperature difference in the capillary radial direction in a thermostat to which the present invention is not applied.
Figure 6:
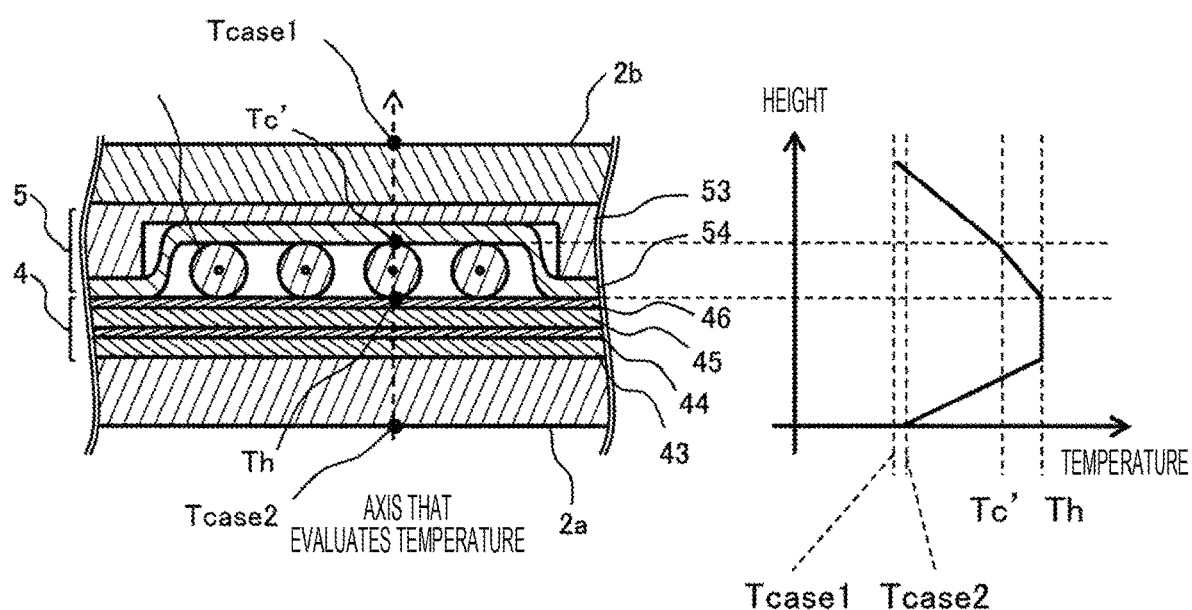
FIG. 6 is a diagram for explaining a temperature difference in the capillary radial direction.

FIG. 5 illustrates the temperature distribution from the case body 2a to the case lid 2b in a thermostat in which the dent 55 is not provided in the support substrate 53. FIG. 6 illustrates the temperature distribution in the radial direction of the capillary 6 in the thermostat 1 according to the present embodiment.

As illustrated in FIG. 5, when the temperature of the first heat conduction sheet 46 is controlled to be a temperature Th without providing the dent 55 in the support substrate 53, since the second heat conduction sheet 54 is not in contact with the first heat conduction sheet 46, the temperature Tc of the second heat conduction sheet 54 becomes lower than the temperature Th of the first heat conduction sheet 46 (Th>Tc), and a temperature difference of Th−Tc occurs in the radial direction of the capillary 6. Further, the temperature of the case lid 2b is Tcase 1, and the temperature of the case body 2a is Tcase 2.

FIG. 6 illustrates the temperature distribution in the present embodiment. When the dents 55 are provided in the support substrate 53, the second heat conduction sheet 54 is in contact with the first heat conduction sheet 46 in the region other than the dents 55, so the temperature (Tc') of the second heat conduction sheet 54 is higher than the temperature (Tc) of the second heat conduction sheet 54 illustrated in FIG. 5 (Tc'>Tc). Therefore, the temperature difference (Th−Tc') occurred in the first heat conduction sheet 46 and the second heat conduction sheet 54 is reduced. Therefore, the temperature difference between both contact points of the capillary 6 in contact with both heat conduction sheets can be suppressed to a small value ({Th−Tc}>{Th−Tc'}).

Thus, the heat generation amount of the detection window 41 of the heater layer 44 and the opening portion 21 provided in the case body 2a is increased. By providing the dents 55 in the support substrate 53, temperature variation in the longitudinal direction and the radial direction of the capillary 6 can be reduced, and a decrease in the separation performance of a sample in capillary electrophoresis can be suppressed.

Next, a second embodiment of the present invention will be described. The second embodiment is an example of a structure in which the heights of the dents provided in the support substrate 53 are two stages.

The description of the portions having the same functions as the portions given the same reference numerals as already described will be omitted.

Figure 7A:
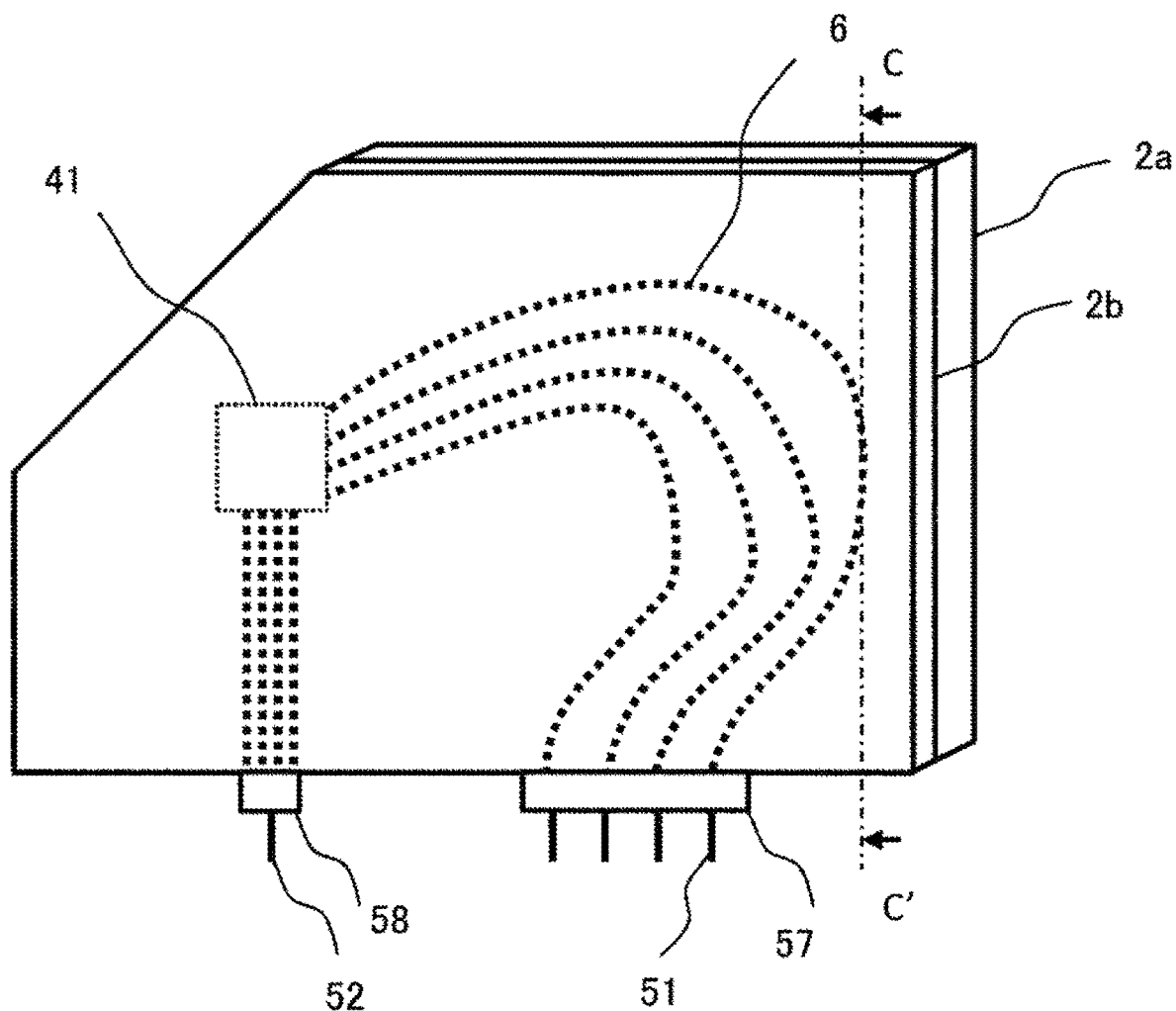
FIG. 7A is a schematic perspective view of a thermostat.
Figure 7B:
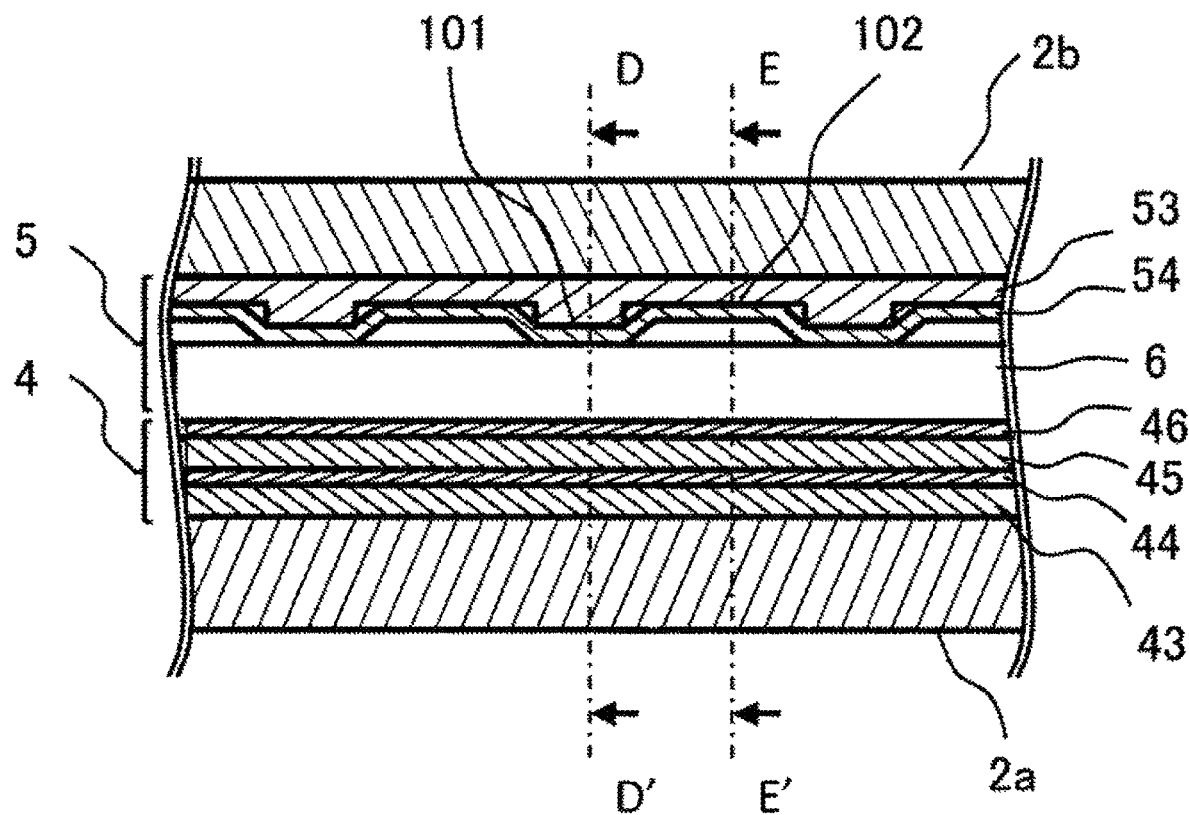
FIG. 7B is a cross-sectional view of a thermostat.
Figure 8A:
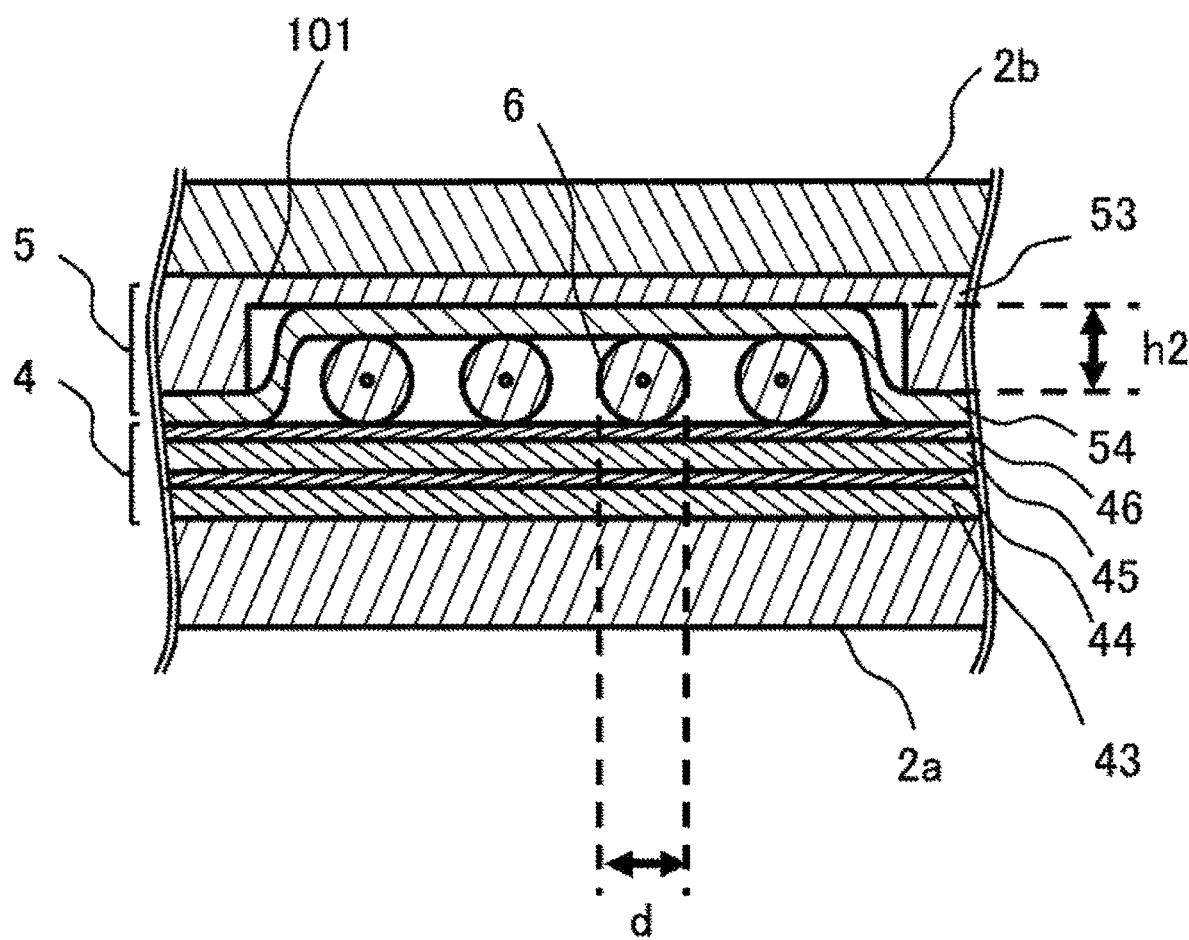
FIG. 8A is a cross-sectional view of a thermostat.
Figure 8B:
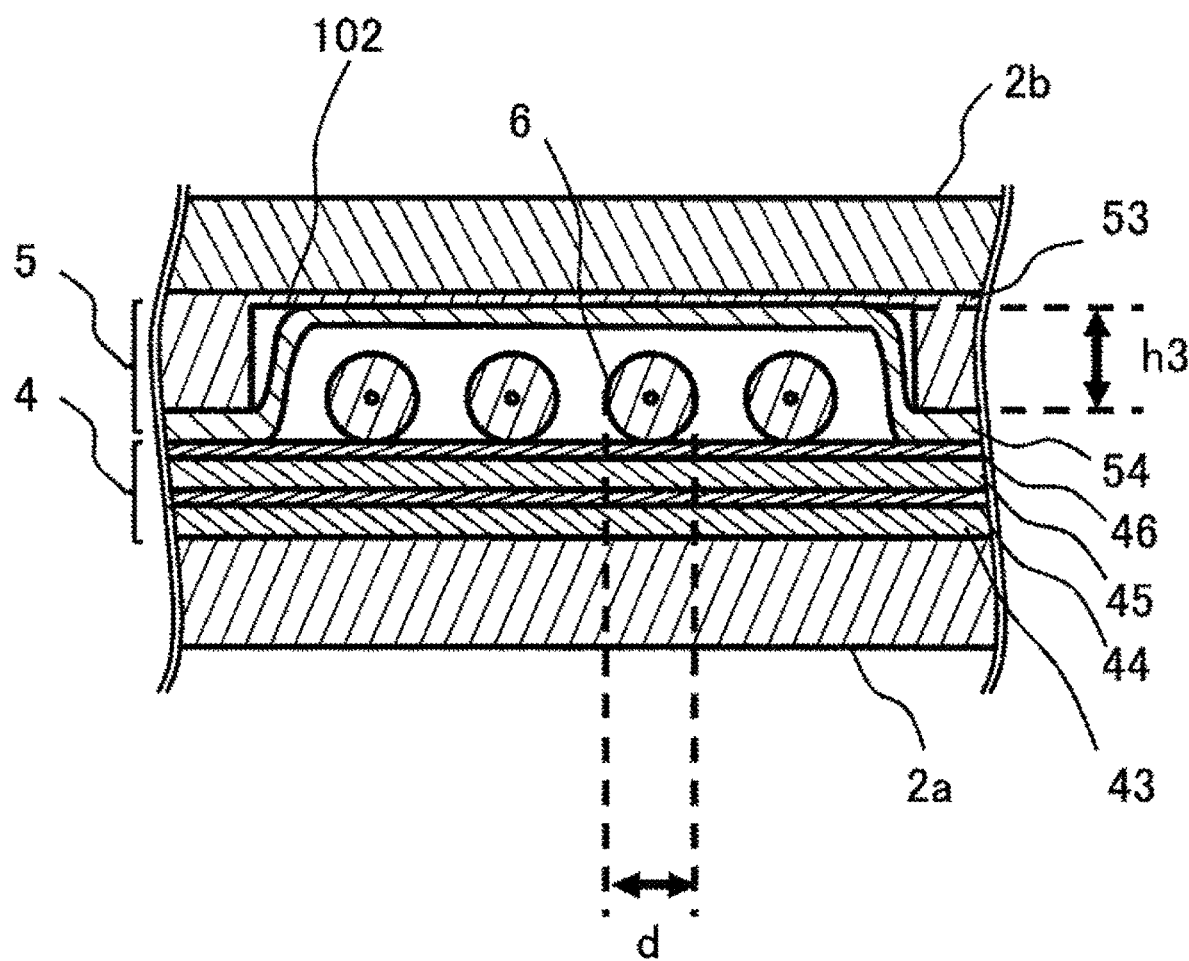
FIG. 8B is a cross-sectional view of a thermostat.

FIGS. 7 and 8 illustrate a thermostat according to the second embodiment and a cross-sectional view thereof. FIG. 7A is a schematic perspective view of the thermostat. FIG. 7B is a cross-sectional view taken along line C-C in the longitudinal direction of the capillary. FIG. 8A is a cross-sectional view taken along line D-D' of FIG. 7B. FIG. 8B is a cross section taken along line E-E' of FIG. 7B.

The thermostat 1 according to the second embodiment has a structure in which the height of the dent formed in the support substrate 53 is divided into two stages.

As illustrated in FIG. 7B, the support substrate 53 has a first dent 101 and a second dent 102. In the first dent 101, the capillary 6 contacts the second heat conduction sheet 54 and the first heat conduction sheet 46. On the other hand, in the second dent 102, the capillary 6 does not contact the second heat conduction sheet 54. Here, FIG. 8A illustrates a cross section of the first dent 101, and FIG. 8B illustrates a cross section of the second dent 102. As illustrated in FIG. 8A, since the capillary 6 is brought into contact with the second heat conduction sheet 54 and the first heat conduction sheet 46 disposed in the first dent 101, the height (h2) of the first dent 101 is smaller than the diameter (d) of the capillary (h2<d).

Furthermore, as illustrated in FIG. 8B, since the capillary 6 is not brought into contact with the second heat conduction sheet 54 disposed in the second dent 102, the height (h3) of the second dent 102 is larger than the diameter (d) of the capillary (h3>d).

The height of the dent provided in the support substrate 53 is not limited to two stages. Considering the deformation when pressing the case lid 2b against the case body 2a, it may be adjusted such that the height of the dent is set to be three stages or more, the capillary 6 uniformly contacts the first heat conduction sheet 46, and the contact area with the second heat conduction sheet 54 is reduced.

According to the embodiment described above, by reducing the contact area between the second heat conduction sheet 54 and the capillary 6 provided on the capillary holder 5, the influence of the temperature decrease of the capillary due to the second heat conduction sheet 54 whose temperature is lower than that of the first heat conduction sheet 46 can be reduced. Therefore, the capillary 6 approaches the temperature of the first heat conduction sheet 46 which is controlling the temperature, and temperature variation in the capillary radial direction can be suppressed.

REFERENCE SIGNS LIST 1 thermostat
2a case body
2b case lid
3 irradiation detection unit
4 temperature control unit
5 capillary holder
6 capillary
20 electrophoretic medium container
21 opening portion
30 anode buffer container
40 cathode buffer container
41 detection window
42 temperature sensor
43 heat insulation layer
44 heater layer
45 heat diffusion plate
46 first heat conduction sheet
47 heater terminal
48a first heating resistance wire
48b second heating resistance wire
49 base member
50 sample container
51 cathode end
52 anode end
53 support substrate
54 second heat conduction sheet
55 dent
56 capillary detection unit
57 electrode holder
58 capillary head
60 first high heat generation region
61 second high heat generation region
62 liquid feeding mechanism
70 sheet-like heater
80 sampler base
85 Y axis driver
90 Z axis driver
95 X axis driver
100 sample tray
101 first dent
102 second dent
115 electrode
150 auto sampler unit
160 irradiation detection/thermostat unit

The invention claimed is:

1. A capillary electrophoresis apparatus, comprising:
a thermostat having a heat source, a first heat conduction member, and a detection window for detecting a sample, the thermostat being configured to maintain a plurality of capillaries at a predetermined temperature;
a capillary holder comprising:
a second heat conduction member sandwiching the plurality of capillaries between the second heat conduction member and the first heat conduction member, the capillary holder being configured to hold the plurality of capillaries; and
one or more dents provided along a portion where the plurality of capillaries are held, wherein
in a first dent, one or more of the plurality of capillaries do not contact the second heat conduction member; and
a detection unit configured to detect a sample to be electrophoresed in one or more of the plurality of capillaries, wherein
in the heat source, a heat generation amount of at least one of a periphery of the detection window and an end of one or more of the plurality of capillaries is higher than a heat generation amount of another portion.

2. The capillary electrophoresis apparatus according to claim 1,
wherein the heat generation amount of the heat source is set to decrease with distance from the periphery of the detection window.

3. The capillary electrophoresis apparatus according to claim 1, wherein the heat generation amount of the heat source is set to decrease with distance from the end of one or more of the plurality of capillaries.

4. The capillary electrophoresis apparatus according to claim 1, wherein
the heat source is a sheet-like heater and has heating resistance wires connected in series, and
the heating resistance wires of at least one of the periphery of the detection window and the end of one or more of the plurality of capillaries in the capillary holder are disposed more densely than the heating resistance wires of a periphery portion of the capillary holder.

5. The capillary electrophoresis apparatus according to claim 1, wherein
in a second dent, one or more of the plurality of capillaries contacts the second heat conduction member.

6. The capillary electrophoresis apparatus according to claim 5,
wherein one or more of the dents is provided for each of the plurality of capillaries.

7. The capillary electrophoresis apparatus according to claim 5,
wherein a height of one or more of the dents is smaller than an outer diameter of one or more of the plurality of capillaries.

8. The capillary electrophoresis apparatus according to claim 5,
wherein one or more of dents has at least two different heights that are smaller than and larger than an outer diameter of one or more of the plurality of capillaries.

9. The capillary electrophoresis apparatus according to claim 1,
wherein the second heat conduction member has flexibility.

10. The capillary electrophoresis apparatus according to claim 1,
wherein a heat diffusion plate is provided between the first heat conduction member and the heat source.

11. The capillary electrophoresis apparatus according to claim 1, wherein the end of one or more of the plurality of capillaries is an end on a cathode side.

12. The capillary electrophoresis apparatus according to claim 1,
wherein both ends of one or more of the plurality of capillaries protrude from the capillary holder, one end is fixed to the capillary holder, and another end is fixed to an electrode holder.

13. The capillary electrophoresis apparatus according to claim 1, wherein
the heat source is a sheet-like heater and has heating resistance wires connected in series, and a width of the heating resistance wires of at least one of the periphery of the detection window and the end of one or more of the plurality of capillaries in the capillary holder is narrower than a width of the heating resistance wires of other places.

14. A capillary electrophoresis apparatus comprising,
a thermostat having a heat source, a first heat conduction member, and a detection window for detecting a sample, the thermostat being configured to maintain a capillary at a predetermined temperature,
a capillary holder having a second heat conduction member for sandwiching the capillary between the second heat conduction member and the first heat conduction member, the capillary holder being configured to hold the capillary; and
a detection unit configured to detect a sample to be electrophoresed in the capillary, wherein
in the heat source, a heat generation amount of at least one of a periphery of the detection window and an end of the capillary is higher than a heat generation amount of another portion; and
the heat source is a sheet-like heater and has heating resistance wires connected in series, and a width of the heating resistance wires of at least one of the periphery of the detection window and the end of the capillary in the capillary holder is narrower than a width of the heating resistance wires of other places.

15. A thermostat used in a capillary electrophoresis apparatus, comprising:
a heat source,
a heat conduction member, and
a detection window for detecting a sample, and houses a capillary used for electrophoresis of a sample to be detected, wherein
in the heat source, a heat generation amount of at least one of a periphery of the detection window and an end of the capillary is higher than a heat generation amount of another portion, and
the heat source is a sheet-like heater and has heating resistance wires connected in series, and a width of the heating resistance wires of at least one of the periphery of the detection window and the end of the capillary in the capillary holder is narrower than a width of the heating resistance wires of other places.

* * * * *